(12) United States Patent
Kim et al.

(10) Patent No.: US 9,191,887 B2
(45) Date of Patent: Nov. 17, 2015

(54) METHOD FOR PROVIDING RELAY NETWORK, MOBILE ROUTER AND NETWORK RELAY SYSTEM USING THE SAME

(71) Applicant: Samsung Electro-Mechanics, Co., Ltd., Suwon, Gyunggi-do (KR)

(72) Inventors: Se Jong Kim, Gyunggi-do (KR); Dae Yeol Seo, Gyunggi-do (KR)

(73) Assignee: Samsung Electro-Mechanics, Co., Ltd., Suwon-si (KR)

( * ) Notice: Subject to any disclaimer, the term of this patent is extended or adjusted under 35 U.S.C. 154(b) by 192 days.

(21) Appl. No.: 14/029,567

(22) Filed: Sep. 17, 2013

(65) Prior Publication Data

US 2015/0004930 A1  Jan. 1, 2015

(30) Foreign Application Priority Data

Jun. 28, 2013  (KR) ........................ 10-2013-0075756

(51) Int. Cl.
| | |
|---|---|
| *H04M 11/00* | (2006.01) |
| *H04W 48/18* | (2009.01) |
| *H04W 4/26* | (2009.01) |
| *H04M 15/00* | (2006.01) |
| *H04W 88/06* | (2009.01) |

(52) U.S. Cl.
CPC .............. *H04W 48/18* (2013.01); *H04M 15/90* (2013.01); *H04W 4/26* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2012/0120934 A1 | 5/2012 | Cho | |
| 2013/0107783 A1* | 5/2013 | Shaw | H04W 4/06 370/312 |
| 2014/0206346 A1* | 7/2014 | Kiukkonen | H04W 52/0229 455/426.1 |
| 2014/0254499 A1* | 9/2014 | Hassan | H04W 12/08 370/329 |

FOREIGN PATENT DOCUMENTS

| | | |
|---|---|---|
| KR | 1020110107108 A | 9/2011 |
| KR | 10-2012-0052092 A | 5/2012 |

* cited by examiner

*Primary Examiner* — Suhail Khan
(74) *Attorney, Agent, or Firm* — NSIP Law (57) ABSTRACT

There are provided a method for providing a relay network and a mobile router and a network relay system using the same. The method for providing the relay network is performed in the mobile router generating the relay network using a plurality of mobile terminals. The method for providing the relay network includes checking a remaining data usage amount for the plurality of respective mobile terminals using a first wireless communications network, checking a tethering priority using the remaining data usage amount and determining a first mobile terminal having the highest tethering priority, and configuring the relay network by providing wireless data provided from the remainder of mobile terminals to the first mobile terminal through a second wireless communications network.

14 Claims, 7 Drawing Sheets

METHOD FOR PROVIDING RELAY NETWORK, MOBILE ROUTER AND NETWORK RELAY SYSTEM USING THE SAME

CROSS-REFERENCE TO RELATED APPLICATIONS

This application claims the priority of Korean Patent Application No. 10-2013-0075756 filed on Jun. 28, 2013, in the Korean Intellectual Property Office, the disclosure of which is incorporated herein by reference.

BACKGROUND OF THE INVENTION

1. Field of the Invention

The present invention relates to a method for providing a relay network, and a mobile router and network relay system using the same.

2. Description of the Related Art

In accordance with a development of electronics technology, miniaturization and the implementation of multi-functionalization in mobile communications terminals have been implemented. Particularly, the application of various types of wireless communications technology to mobile communications terminals has occurred, and various kinds of wireless communications such as cellular communications, wireless local area networks, Bluetooth, and the like have also been applied to mobile terminals such as smartphones.

As a plurality of types of wireless communications technology are applied to a single terminal, a network relay technology, controlling a use of a relatively inexpensive wireless communications network, has become an issue. In addition, the above-mentioned technology has developed in the direction of technology in which a predetermined wireless network can be formed between a plurality of wireless terminals and a wireless communications network can be relayed using the plurality of terminals. As an example of the above-mentioned technology, technologies such as a tethering have been developed.

Recently, technologies designating any one of the plurality of terminals as a gateway to allow the plurality of terminals to perform the tethering through any one designated terminal have been developed.

As examples of the above-mentioned related art, Patent Document 1 of the following Related Art Documents discloses a technology related to a method for providing a relay network, a network connection method and a wireless communications group applying the same, and Patent Document 2 discloses a technology related to a tethering service based traffic control system and a method thereof.

However, the above-mentioned related art inventions provide the tethering using any one of the plurality of mobile terminals, but consideration of a portion becoming a main portion needs to be made in providing the above-mentioned network, that is, charges for providing the network may be excessive.

In addition, there is a limitation on relay networks in terms of stability. This is a problem frequently occurring due to characteristics of the mobile terminal having signal sensitivity frequently changed according to mobility and has a limitation by which integrity and stability of the communication network may not be secured.

RELATED ART DOCUMENT (Patent Document 1) Korean Patent Laid-Open Publication No. 10-2012-0052092

(Patent Document 2) Korean Patent Laid-Open Publication No. 10-2011-0107108

SUMMARY OF THE INVENTION

An aspect of the present invention provides a method for providing a relay network capable of significantly reducing wireless communications charges for a network relay by considering a current data usage amount of a mobile terminal to determine a tethering terminal and also improving a quality of the relay network by assigning priorities to the tethering terminal while reflecting a status of each mobile terminal to select the mobile terminal, and a mobile router and a network relay system using the same.

According to an aspect of the present invention, there is provided a method for providing a relay network using a mobile router generating the relay network using a plurality of mobile terminals, the method including: checking a remaining data usage amount for the plurality of respective mobile terminals using a first wireless communications network; checking a tethering priority using the remaining data usage amount and determining a first mobile terminal having the highest tethering priority; and configuring the relay network by providing wireless data provided from the remainder of mobile terminals to the first mobile terminal through a second wireless communications network.

The determining of the first mobile terminal may include: checking the remaining data usage amount and communication quality information for the plurality of respective mobile terminals; calculating a priority reference value by assigning a first weight to the checked remaining data usage amount and assigning a second weight to the communication quality information; and determining a mobile terminal having the highest priority reference value as the first mobile terminal.

The remaining data usage amount may be determined by subtracting a data amount used to the present time from a free data usage amount assigned to the mobile terminal, and the mobile terminal may calculate the remaining data usage amount thereof.

The communication quality information may include at least one of strength in signal intensity between the mobile router and the mobile terminal, a rate of change in the signal intensity, a type of mobile network to which the mobile terminal is connected, and signal intensity for a cellular network of the mobile terminal.

The determining of the first mobile terminal may include: checking priority calculating conditions for calculating the priority reference value; and changing at least one of the first and second weights according to the priority calculating conditions.

The priority calculating conditions may include at least one of a data amount preference condition in which the first weight is greater than the second weight, a state preference condition in which the second weight is greater than the first weight, and a designated condition capable of setting the first and second weights.

The determining of the first mobile terminal may further include requesting the first mobile terminal so as to set the first mobile terminal as a tethering terminal.

According to an aspect of the present invention, there is provided a method for providing a relay network using a mobile terminal generating the relay network using a mobile router and a plurality of remainder of mobile terminals, the method including: calculating an own remaining data usage amount and providing the remaining data usage amount to the mobile router through a first wireless communications network; and when being set as a tethering terminal by the mobile router, transmitting, in a tethering scheme, an amount of mobile data provided from the mobile router through a second wireless communications network.

The method may further include providing communications quality information including at least one of strength in signal intensity between the mobile router and the mobile terminal, a rate of change in the signal intensity, a type of mobile network to which the mobile terminal is connected, and signal intensity for a cellular network of the mobile terminal, to the mobile router.

The method may further include: when not being set as the tethering terminal, setting the mobile router as a tethering-targeting terminal; and when a mobile communications request occurs, performing a tethering service by transmitting an amount of mobile data according to the mobile communications request to the mobile router.

The transmitting of the amount of mobile data in the tethering scheme may include transmitting the mobile data received from the mobile router through a second wireless communications network to an external network through a third wireless communications network.

According to an aspect of the present invention, there is provided a mobile router generating a relay network using a plurality of mobile terminals, the mobile router including: first and second wireless communications units each performing wireless communications with the plurality of mobile terminals using different communications standards; and a controlling unit checking a remaining data usage amount for the plurality of respective mobile terminals using the first wireless communications unit, determining a tethering terminal of the relay network using the remaining data usage amount, and forming the relay network with the tethering terminal using the second wireless communications unit.

The controlling unit may include: a remaining amount managing module managing the remaining data usage amount of the plurality of mobile terminals; and a priority setting module checking a tethering priority using the remaining data usage amount and determining a mobile terminal having the highest tethering priority as the tethering terminal.

The controlling unit may further include a relay managing module configuring the relay network by providing wireless data transmitted from the remainder of mobile terminals through the second wireless communications unit to the tethering terminal.

The priority setting module may calculate a priority reference value by checking the remaining data usage amount and communication quality information for the plurality of respective mobile terminal, assigning a first weight to the checked remaining data usage amount and assigning a second weight to the communication quality information.

The communication quality information may include at least one of strength in signal intensity between the mobile router and the mobile terminal, a rate of change in the signal intensity, a type of mobile network to which the mobile terminal is connected, and signal intensity for a cellular network of the mobile terminal.

The priority setting module may check priority calculating conditions for calculating the priority reference value and changes at least one of the first and second weights according to the priority calculating conditions.

The priority calculating conditions may include at least one of a data amount preference condition in which the first weight is greater than the second weight, a state preference condition in which the second weight is greater than the first weight, and a designated condition capable of setting the first and second weights.

The first wireless communications unit may use a local area wireless communications standard; and the second wireless communications unit may use a wireless communications standard capable of transmitting massive data.

According to an aspect of the present invention, there is provided a network relay system, including: a plurality of mobile terminals supporting first and second wireless communications standards, respectively; and a mobile router collecting a remaining data usage amount for the plurality of respective mobile terminals using the first wireless communications standard and determining a tethering terminal of a relay network using the remaining data usage amount.

The mobile router may form the relay network with the tethering terminal using the second wireless communications standard when the tethering terminal is determined.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

First, tethering, as disclosed below, is used in a wide sense, including a technology capable of accessing the Internet from another device via a relay unit by utilizing an Internet-enabled device as the relay unit. Therefore, the tethering referred hereinafter is not limited to a tethering technology which is typically implemented.

Figure 1:
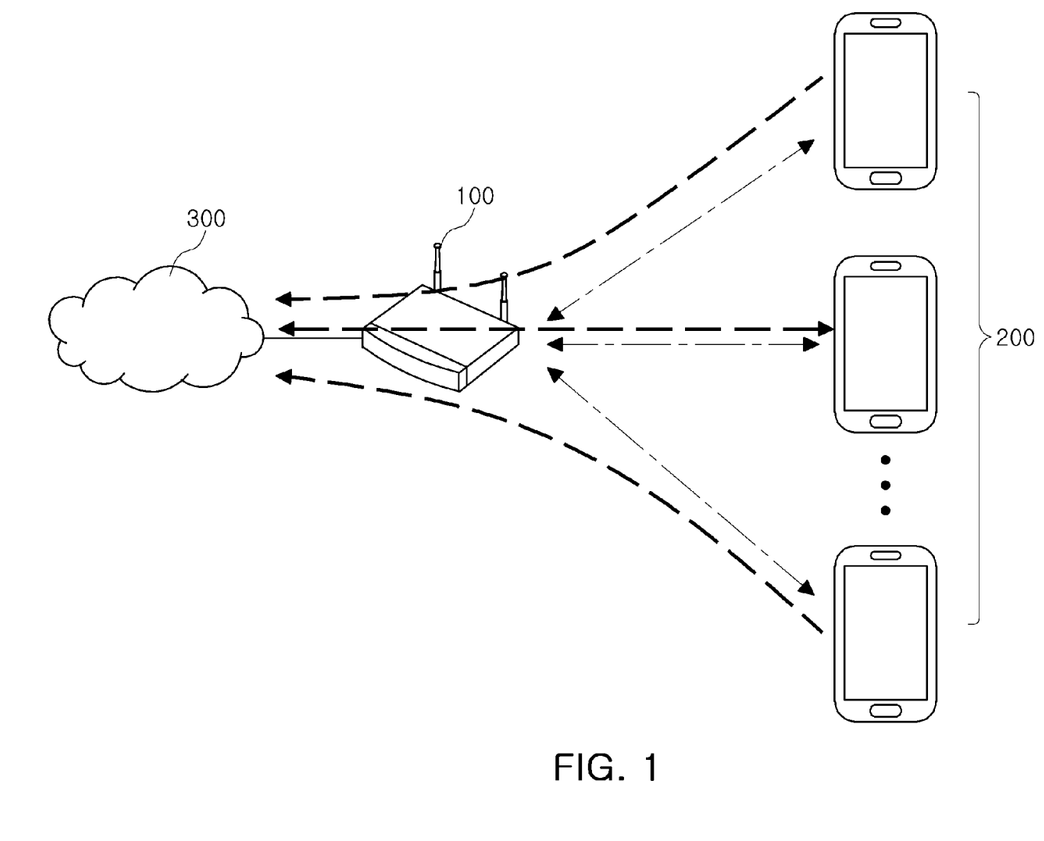
FIG. 1 is a reference diagram illustrating an example of a general network relay system.

FIG. 1 is a reference diagram illustrating an example of a general network relay system.

Referring to FIG. 1, the network relay system includes a plurality of mobile terminals 200 and a mobile router 100.

The plurality of mobile terminals 200 may be connected to an external network 300, such as the Internet, via the mobile router 100.

The network relay system shown in FIG. 1 illustrates an example which does not support tethering. Therefore, since utility of the mobile terminal 200 becomes relatively low and the relay network is fixed, there may be a limitation in that a flexible network configuration may be impossible.

Figure 2:
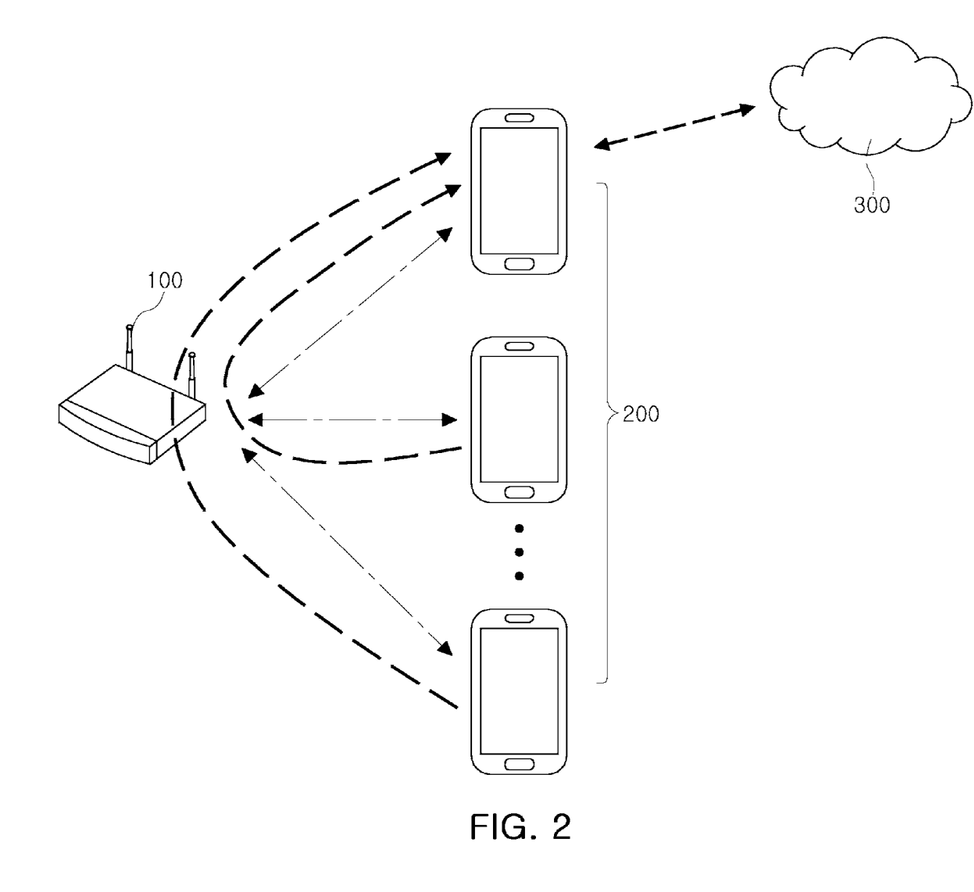
FIG. 2 is a reference diagram illustrating an example of a network relay system according to an embodiment of the present invention.

FIG. 2 is a reference diagram illustrating an example of a network relay system according to an embodiment of the present invention.

Referring to FIG. 2, the network relay system according to the embodiment of the present invention includes a plurality of mobile terminals 200 and a mobile router 100.

Here, any one of the mobile terminals 200 may be connected to an external network 300 and the relevant mobile terminal 200 is referred to as a tethering terminal providing a tethering service.

A remainder of mobile terminals, other than the tethering terminal, may be connected to the external network 300 by accessing the tethering terminal via the mobile router 100. That is, the mobile terminal in the general tethering technology directly accesses the tethering terminal while the mobile terminal in the present invention accesses the tethering terminal using the mobile router 100.

Thereby, since the mobile terminal using the tethering service determines the mobile router 100 as a communications target without requiring the setting of a separate routing path, the setting of a network becomes relatively simple. In addition, taking the network relay system as a whole, a change of the tethering terminal is relatively easy.

The mobile router 100 may collect a remaining data usage amount for the plurality of respective mobile terminals 200 and may determine the tethering terminal of the relay network using the remaining data usage amount. The mobile router 100 may inform the determined tethering terminal thereof to thereby set the tethering service. The mobile router 100 may configure the relay network by providing mobile data transmitted from remainder of mobile terminals, other than the tethering terminal, to the tethering terminal.

In the embodiment of the present invention, the plurality of mobile terminals 200 and the mobile router 100 may respectively support a plurality of wireless communications standards. Therefore, a plurality of wireless communications networks may be formed between the plurality of mobile terminals 200 and the mobile router 100. For example, the mobile router 100 may collect the remaining data usage amount for the plurality of respective mobile terminals 200 using a first wireless communications network and may provide the tethering service using a second wireless communications network.

Therefore, the first wireless communications network (or the wireless communications standard) may also be applied to a communications network (or a wireless communications standard) having a low network band or transmission speed. On the other hand, the second wireless communications network (or the wireless communications standard) configuring the tethering service may be required to transmit a massive amount of wireless data.

According to the embodiment of the present invention, the first wireless communications network may use a local area wireless communications standard such as ZigBee, Bluetooth, and the like, and the second wireless communications network may use a wireless communications standard capable of transmitting massive amounts of data, such as a Wi-Fi and the like.

Hereinafter, the mobile router 100 will be described in more detail with reference to FIGS. 3 and 4.

Figure 3:
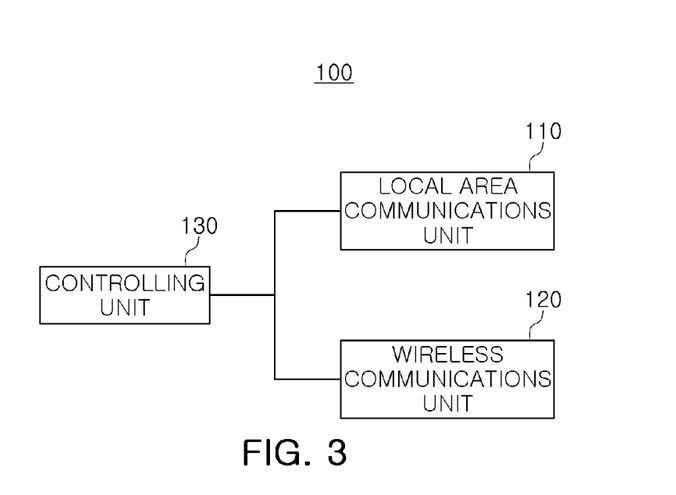
FIG. 3 is a configuration diagram for describing a mobile router according to an embodiment of the present invention.
Figure 4:
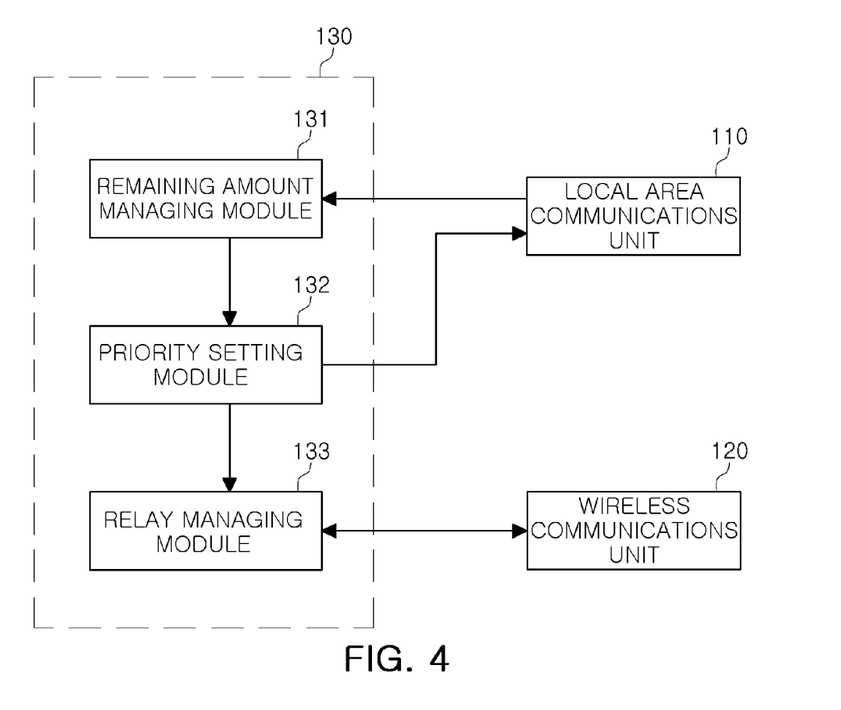
FIG. 4 is a detailed configuration diagram for describing a controlling unit of the mobile router of FIG. 3.

FIG. 3 is a configuration diagram for describing a mobile router according to an embodiment of the present invention and FIG. 4 is a detailed configuration diagram for describing a controlling unit of the mobile router of FIG. 3.

Referring to FIGS. 3 and 4, the mobile router 100 includes a local area communications unit 110, a wireless communications unit 120, and a controlling unit 130.

The local area communications unit 110 may form a local area wireless communications network with the mobile terminal using the local area communications standard such as ZigBee, Bluetooth, or the like.

The wireless communications unit 120 may form a wireless communications network with the mobile terminal using a predetermined wireless communications standard. Since the wireless communications unit 120 configures the relay network for providing the tethering service, the wireless communications standard in the present specification uses a standard capable of ensuring the data transmission at a certain speed or capacity or more, such as Wi-Fi or the like.

The controlling unit 130 may check a remaining data usage amount for the plurality of respective mobile terminals and may determine the tethering terminal of the relay network using the checked remaining data usage amount. In addition, the controlling unit 130 may form the relay network with the tethering terminal using the wireless communications unit 120.

The controlling unit 130 may calculate a tethering priority and may determine the mobile terminal having the highest tethering priority as being the tethering terminal.

Described in more detail with reference to FIG. 4, the controlling unit 130 may include a remaining amount managing module 131, a priority setting module 132, and a relay managing module 132.

The remaining amount managing module 131 may check a remaining data usage amount for the plurality of respective mobile terminals using the local area communications unit 110.

The priority setting module 132 may determine the tethering terminal of the relay network using the remaining data usage amount. The priority setting module 132 may provide a request for setting the tethering service to the tethering terminal using the local area communications unit 110. When receiving an appropriate response for the request, the priority setting module 132 requests the relay managing module 133 to perform the tethering service.

In accordance with the embodiment of the present invention, the tethering priority may be calculated in consideration of the remaining data usage amount of the mobile terminal. For example, the priority setting module 132 may determine the mobile terminal having the greatest remaining data usage amount as the tethering terminal.

Here, the mobile terminal retains an amount of a free data usage amount which has not been used and the remaining data usage amount may be a current free data usage amount. That is, the remaining data usage amount may be determined by subtracting the data amount used to the present time from the free data usage amount assigned to the mobile terminal. In addition, the above-mentioned remaining data usage amount may be calculated by each mobile terminal itself. Therefore, the priority setting module 132 may request information for the remaining data usage amount to the plurality of the respective mobile terminals to thereby check the remaining data usage amount of the respective mobile terminal.

In according to the embodiment of the present invention, the tethering priority may be calculated in consideration of the remaining data usage amount of the mobile terminal and communication quality information. The priority setting module 132 may check the remaining data usage amount and the communication quality information for the plurality of respective mobile terminals. The priority setting module 132 may assign a first weight to the checked remaining data usage amount and may assign a second weight to the communication quality information to thereby calculate a priority reference value. The priority setting module 132 may determine the mobile terminal having the highest calculated priority reference value as the tethering terminal.

Here, the communications quality information is quality information for a wireless communications environment of respective mobile terminals. For example, the communications quality information may include at least one of strength in signal intensity between the mobile router 100 and the relevant mobile terminal, a rate of change in the signal intensity, a type of mobile network to which the relevant mobile terminal may be connected, and signal intensity for a cellular network of the relevant mobile terminal. That is, the communication quality information may include communications quality between the mobile router 100 and the relevant mobile terminal 200 as well as communications quality between the relevant mobile terminal 200 and the external network 300.

According to the embodiment of the present invention, the priority setting module 132 may check priority calculating conditions for calculating the priority reference value and may change at least one of the first and second weights according to the priority calculating conditions.

For example, the priority calculating conditions may include at least one of a data amount preference condition, a state preference condition, and a designated condition. Here, the data amount preference condition is a condition putting a higher value on the remaining data usage amount of the mobile terminal, and the first weight is greater than the second weight. In addition, the state preference condition is a condition putting a higher value on network quality, and the second weight is greater than the first weight. The designated condition is a condition capable of setting the first and second weights.

In accordance with the embodiment of the present invention, the priority setting module 132 may re-calculate the priority reference value for the plurality of respective mobile terminals by reflecting the changed priority calculating condition when a change in the priority calculating conditions occurs. The priority setting module 132 may update the tethering terminal according to the re-calculated priority reference value.

In accordance with the embodiment of the present invention, the mobile router 100 may be connected to the external network 300, and the priority setting module 132 may directly configure the relay network so as to use the external network 300 connected to the mobile router 100 when the priority reference values calculated for the plurality of mobile terminals is below a predetermined threshold.

After checking the priority calculating condition for calculating the priority reference value, at least one of the first and second weights may be changed according to a kind of priority calculating conditions.

The relay managing module 133 may receive information for the priority setting module 132 to thereby provide the tethering service using the wireless communications unit 120. That is, the priority setting module 132 may provide the information for the determined tethering terminal to the relay managing module 133, and the relay managing module 133 may provide wireless data transmitted from remainder of mobile terminals to the tethering terminal through the wireless communications unit 120 to thereby configure the relay network.

Hereinafter, the mobile terminal 200 will be described in more detail with reference to FIGS. 5 and 6.

Figure 5:
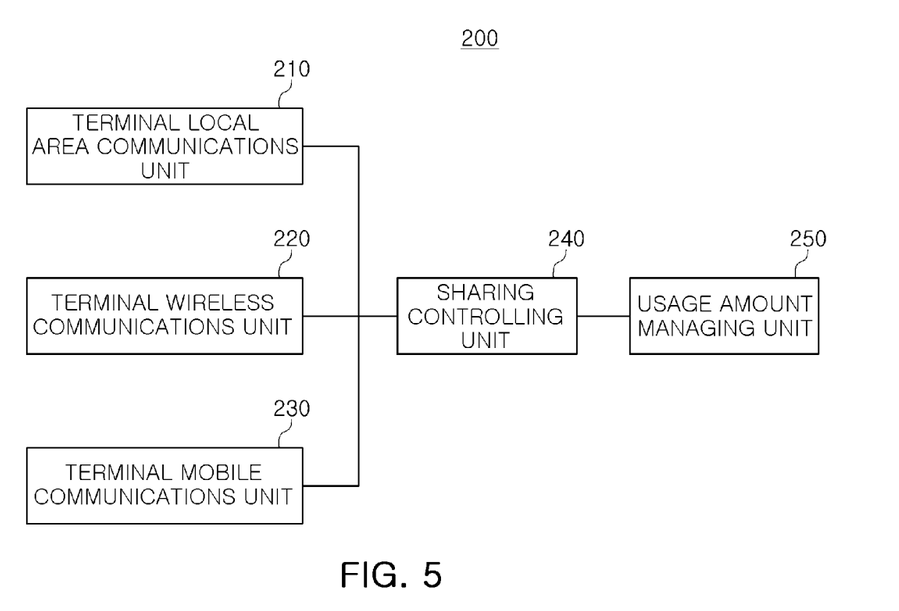
FIG. 5 is a configuration diagram for describing a mobile terminal according to an embodiment of the present invention.
Figure 6:
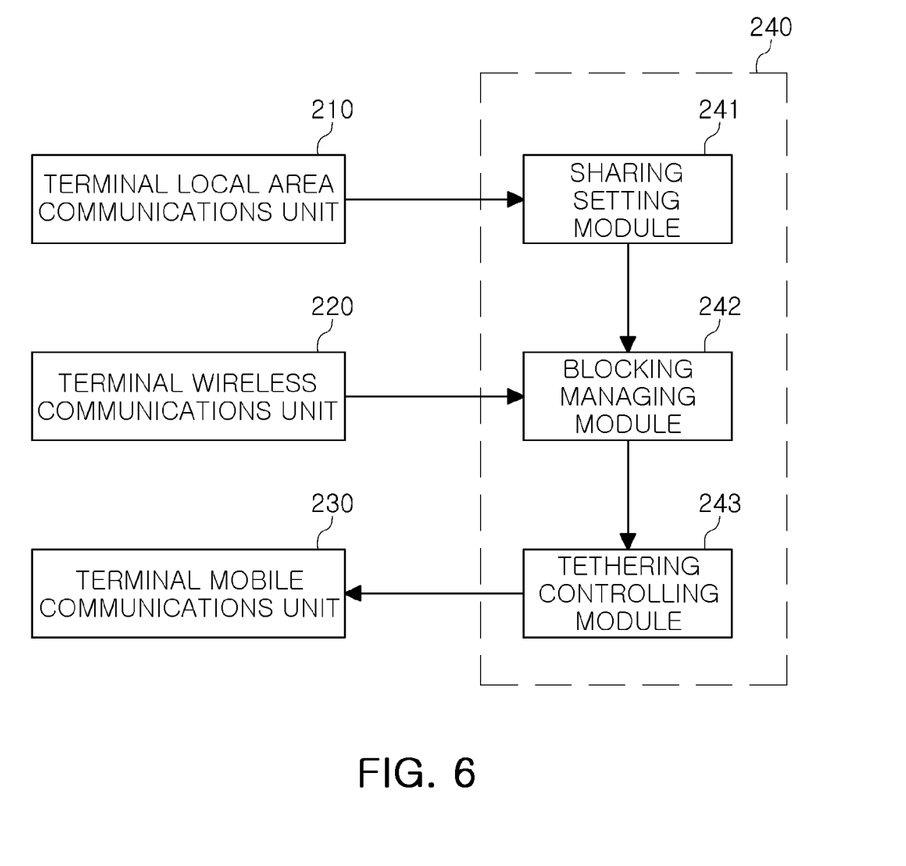
FIG. 6 is a detailed configuration diagram for describing a sharing controlling unit of the mobile terminal of FIG. 5.

FIG. 5 is a configuration diagram for describing a mobile terminal according to an embodiment of the present invention and FIG. 6 is a detailed configuration diagram for describing a sharing controlling unit of the mobile terminal of FIG. 5.

The mobile terminal 200 may include a terminal local area communications unit 210, a terminal wireless communications unit 220, a terminal mobile communications unit 230, a sharing controlling unit 240, and a usage amount managing unit 250.

The terminal local area communications unit 210 may form a local area wireless communications network with the local area communications unit 110 of the mobile terminal, and the terminal wireless communications unit 220 may form a wireless communications network—a communications network for the tethering service—having a predetermined band or more with the local area communications unit 110 of the mobile terminal. The terminal mobile communications unit 230 may be connected to the external network (300 of FIG. 1).

The usage amount managing unit 250 may manage the remaining data usage amount of the mobile terminal. The usage amount managing unit 250 may determine the remaining data usage amount by monitoring a wireless data amount transmitted or received using the terminal mobile communications unit 230 and subtracting the transmitted or received wireless data usage amount from a free data usage amount assigned to the data usage amount managing unit 250 (or a preset threshold data usage amount). Here, the threshold data usage amount may be a value set by a user.

The sharing controlling unit 240 may provide its own remaining data usage amount to the mobile router using the terminal local area communications unit 210. When receiving a request for setting the tethering terminal from the mobile router, the sharing controlling unit 240 may provide wireless data received from the mobile router through the terminal wireless communications unit 220 to the external network through the terminal mobile communications unit 230 to thereby provide the tethering service.

The sharing controlling unit 240 may include a sharing setting module 241, a blocking managing module 242, and a tethering controlling module 243.

The sharing setting module 241 may be connected to the mobile router using the terminal local area communications unit 210 and may control the blocking managing module 242 so as to receive data provided from the terminal wireless communications unit 220 when receiving the request for setting the tethering terminal from the mobile router.

According to the embodiment of the present invention, the sharing setting module 241 may provide, to the mobile router, the communication quality information including at least one of strength in signal intensity between the mobile router and the sharing setting module 241, a rate of change in the signal intensity, a type of mobile network to which the sharing setting module 241 may be connected, and signal intensity for a cellular network of the sharing setting module 241.

According to the embodiment of the present invention, when the sharing setting module 241 is not the tethering terminal, that is, the terminal using the tethering service, the sharing setting module 241 may set the mobile router as a tethering-targeting terminal. That is, the sharing setting module 241 may form the relay network by targeting the mobile router rather than the tethering terminal, for communications. Therefore, when a mobile communications request occurs by an application or the like of the mobile terminal, the tethering service may be used by transmitting an amount of mobile data, according to the mobile communications request, to the mobile router.

The blocking managing module 242 may block wireless data when there is wireless data input through the terminal wireless communications unit 220 and may provide the relevant wireless data to the tethering controlling module 243 when the request of the sharing setting module 241 occurs.

The tethering controlling module 243, a module controlling the tethering service, may provide the wireless data provided from the blocking managing module 242 to the external network using the terminal mobile communications unit 230. The tethering controlling module 243 may perform functions such as modulation/demodulation/encryption required for the tethering, as necessary.

Figure 7:
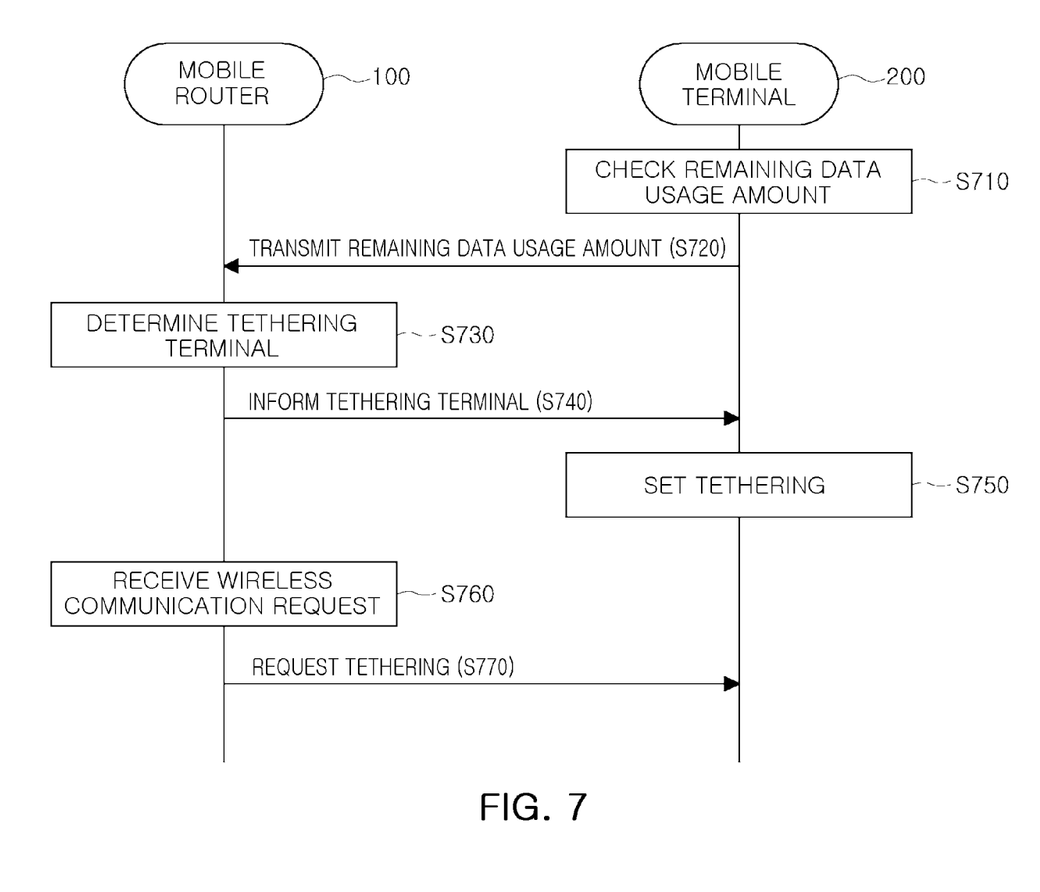
FIG. 7 is a flow chart for describing a method for providing a relay network according to an embodiment of the present invention.
Figure 8:
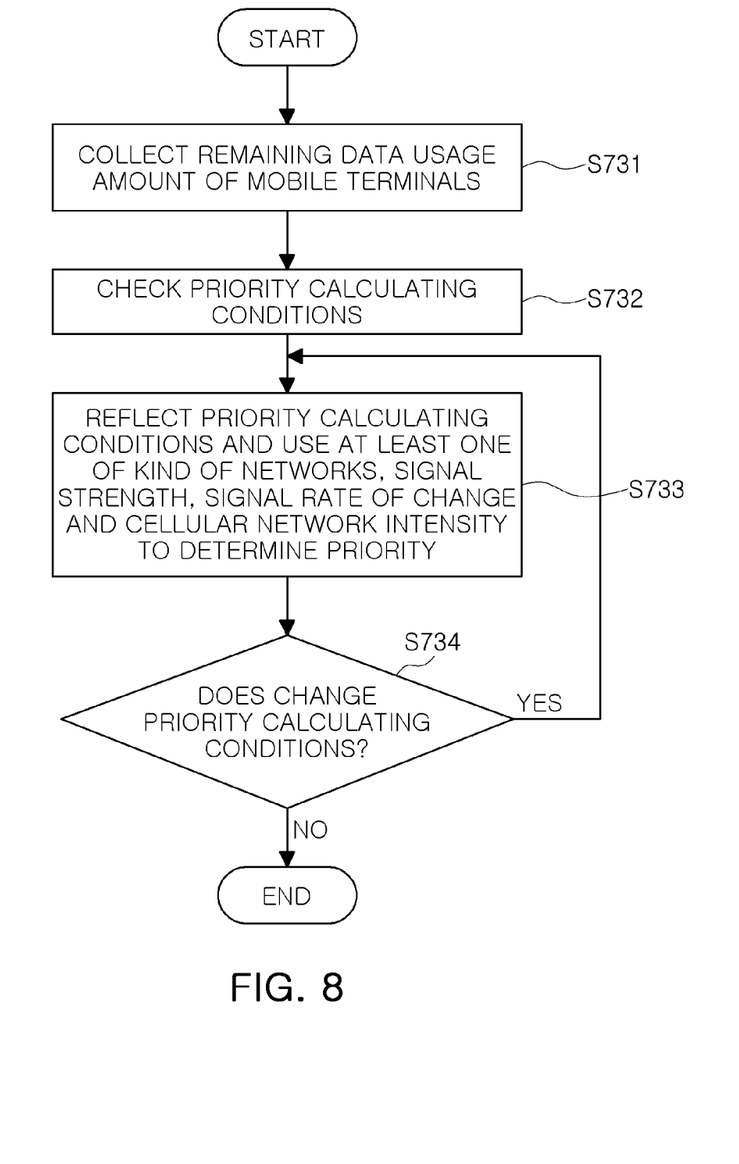
FIG. 8 is a detailed flow chart for describing an embodiment of an operation of determining a tethering terminal in FIG. 7.

FIG. 7 is a flow chart for describing a method for providing a relay network according to an embodiment of the present invention and FIG. 8 is a detailed flow chart for describing an embodiment of an operation of determining a tethering terminal in FIG. 7.

Hereinafter, various embodiments of a method for providing a relay network according to an embodiment of the present invention will be described with reference to FIGS. 7 and 8. However, since the providing methods to be described below are performed by the mobile terminal or the mobile router described with reference to FIGS. 2 through 6, descriptions of contents that are the same as or correspond to the above-mentioned contents will be omitted.

Referring to FIG. 7, the mobile terminal 200 may check its own remaining data usage amount (S710) and may provide the checked remaining data usage amount to the mobile router 100 (S720).

The mobile router 100 may determine the tethering terminal using the remaining data usage amount received from the plurality of mobile terminals (S740). Alternatively, according to the embodiment of the present invention, the tethering terminal may be determined using communications quality information together with the remaining data usage amount.

When the tethering terminal is determined, the mobile router 100 may inform the relevant mobile terminal of the determined tethering terminal (S740).

The mobile terminal 200 receiving the tethering terminal setting request may be set to perform the tethering service (S750).

Next, when there is a wireless communication request received from the remainder of mobile terminals (S760), the mobile router 100 may request the tethering service by providing the wireless communication request to the mobile terminal 200.

As described above, the mobile router 100 and the mobile terminal 200 may form a plurality of wireless communications networks and the transmission of the remaining data usage amount (S720) and a request of the tethering (S770) may be performed by different wireless communications networks.

Referring to FIG. 8, describing the determining of the tethering terminal (S730) in more detail, the mobile router 100 may collect the remaining data usage amount of the plurality of mobile terminals (S731).

Next, the mobile router 100 may check priority calculating conditions. The priority calculating conditions may include at least one of a data amount preference condition, a state preference condition, and a designated condition (S732).

The mobile router 100 may determine a weight by reflecting the checked priority calculating conditions and may calculate a priority reference value by reflecting the determined weight in the remaining data usage amount or the communications quality information. The mobile router 100 may determine the tethering terminal based on the priority reference value calculated for the plurality of respective mobile terminals 200 (S733).

According to the embodiment of the present invention, the priority calculating conditions may be changed, and when the change occurs (S734; YES), the mobile router 100 may re-perform the determining of the tethering terminal (S733) based on the changed priority calculating conditions.

According to the embodiment of the present invention, when the communications quality information is updated, the mobile router 100 may re-calculate the priority reference value using the updated communications quality information. When a new tethering terminal is determined by the re-calculated priority reference value, the existing tethering terminal may be requested to terminate the tethering service, and the new tethering terminal may be requested to set a tethering terminal.

As set forth above, according to the embodiment of the present invention, wireless communications charges for a network relay may be significantly reduced by considering the current data usage amount of a mobile terminal to determine a tethering terminal, and the quality of a relay network may also be improved by assigning priorities to the tethering terminal while reflecting a status of each mobile terminal to select the mobile terminal.

While the present invention has been shown and described in connection with the embodiments, it will be apparent to those skilled in the art that modifications and variations can be made without departing from the spirit and scope of the invention as defined by the appended claims.

What is claimed is:

1. A method for providing a relay network using a mobile router generating the relay network using a plurality of mobile terminals, the method, performed by the mobile router, comprising:

checking a remaining data usage amount for the plurality of respective mobile terminals using a first wireless communications network;

checking a tethering priority using the remaining data usage amount and determining a first mobile terminal having a highest tethering priority; and configuring the relay network by providing wireless data provided from a remainder of the mobile terminals, which do not have the highest tethering priority, to the first mobile terminal through a second wireless communications network.

2. The method of claim 1, wherein the determining of the first mobile terminal includes:

checking the remaining data usage amount and communication quality information for the plurality of respective mobile terminals;

calculating a priority reference value by assigning a first weight to the checked remaining data usage amount and assigning a second weight to the communication quality information; and determining a mobile terminal having the highest priority reference value as the first mobile terminal.

3. The method of claim 2, wherein the remaining data usage amount is determined by subtracting a data amount used to present time from a free data usage amount assigned to the first mobile terminal, and the first mobile terminal calculates the remaining data usage amount thereof.

4. The method of claim 2, wherein the communication quality information includes at least one of strength in signal intensity between the mobile router and the first mobile terminal, a rate of change in the signal intensity, a type of mobile network to which the first mobile terminal is connected, and signal intensity for a cellular network of the first mobile terminal.

5. The method of claim 2, wherein the determining of the first mobile terminal includes:
checking priority calculating conditions for calculating the priority reference value; and
changing at least one of the first and second weights according to the priority calculating conditions.

6. The method of claim 5, wherein the priority calculating conditions include at least one of a data amount preference condition in which the first weight is greater than the second weight, a state preference condition in which the second weight is greater than the first weight, and a designated condition capable of setting the first and second weights.

7. The method of claim 2, wherein the determining of the first mobile terminal further includes requesting the first mobile terminal so as to set the first mobile terminal as a tethering terminal.

8. A mobile router generating a relay network using a plurality of mobile terminals, the mobile router comprising:
first and second wireless communications units respectively performing wireless communications with the plurality of mobile terminals using different communications standards; and
a controlling unit checking a remaining data usage amount for the plurality of respective mobile terminals using the first wireless communications unit, determining a tethering terminal, having a highest tethering priority, of the relay network using the remaining data usage amount, and forming the relay network with the tethering terminal using the second wireless communications unit by providing wireless data transmitted from a remainder of the mobile terminals, which do not have the highest tethering priority, through the second wireless communications unit to the tethering terminal.

9. The mobile router of claim 8, wherein the controlling unit includes:
a remaining amount managing module managing the remaining data usage amount of the plurality of mobile terminals.

10. The mobile router of claim 9, wherein the priority setting module calculates a priority reference value by checking the remaining data usage amount and communication quality information for the plurality of respective mobile terminals, assigning a first weight to the checked remaining data usage amount and assigning a second weight to the communication quality information.

11. The mobile router of claim 10, wherein the communication quality information includes at least one of strength in signal intensity between the mobile router and the tethering terminal, a rate of change in the signal intensity, a type of mobile network to which the tethering terminal is connected, and signal intensity for a cellular network of the tethering terminal.

12. The mobile router of claim 11, wherein the priority setting module checks priority calculating conditions for calculating the priority reference value and changes at least one of the first and second weights according to the priority calculating conditions.

13. The mobile router of claim 12, wherein the priority calculating conditions include at least one of a data amount preference condition in which the first weight is greater than the second weight, a state preference condition in which the second weight is greater than the first weight, and a designated condition capable of setting the first and second weights.

14. The mobile router of claim 8, wherein the first wireless communications unit uses a local area wireless communications standard; and
the second wireless communications unit uses a wireless communications standard capable of transmitting massive data.

* * * * *